United States Patent
Chen et al.

(10) Patent No.: US 7,936,826 B2
(45) Date of Patent: May 3, 2011

(54) METHOD FOR REDUCING BUFFERED-FRAME MEMORY SIZE AND ACCESS IN VIDEO CODEC

(75) Inventors: Oscal Tzyh-Chiang Chen, Yonghe (TW); Chien-Fa Chen, Jhunan Township, Miaoli County (TW); Chih-Chang Chen, Lioujia Township, Tainan County (TW); Fang-Chu Chen, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1719 days.

(21) Appl. No.: 11/156,290

(22) Filed: Jun. 18, 2005

(65) Prior Publication Data
US 2006/0171685 A1 Aug. 3, 2006

(30) Foreign Application Priority Data
Feb. 1, 2005 (TW) ................................ 94103052 A

(51) Int. Cl.
*H04N 9/877* (2006.01)
*H04N 5/937* (2006.01)
*H04N 7/30* (2006.01)
*H04N 7/50* (2006.01)

(52) U.S. Cl. ................ 375/240.25; 375/240; 375/240.01

(58) Field of Classification Search ............. 375/240.25, 375/240
See application file for complete search history.

(56) References Cited

U.S. PATENT DOCUMENTS

| | | | |
|---|---|---|---|
| 5,398,072 A * | 3/1995 | Auld ......................... | 375/240.25 |
| 5,442,402 A * | 8/1995 | Sohn et al. ................. | 348/416.1 |
| 5,682,204 A * | 10/1997 | Uz et al. .................... | 375/240.15 |
| 5,923,375 A * | 7/1999 | Pau .......................... | 375/240.01 |
| 6,222,886 B1 | 4/2001 | Yogeshwar .............. | 375/240.23 |
| 6,633,608 B1 | 10/2003 | Miller ...................... | 375/240.02 |
| 2005/0053292 A1* | 3/2005 | Mukerjee et al. ............ | 382/236 |
| 2006/0062311 A1* | 3/2006 | Sun et al. ................. | 375/240.24 |
| 2006/0133512 A1* | 6/2006 | Park ........................ | 375/240.25 |

OTHER PUBLICATIONS

ITU-T Recommendation H.264 (May 2003).*
T. Wiegand, etc., "Overview of the H.264/AVC video coding standard," IEEE Trans. on Circuits and Systems for Video Technology, vol. 13, pp. 560-576, Jul. 2003.
J. Ostermann, etc., "Video coding with H.264/AVC: tools, performance, and complexity," IEEE Circuits and Systems Magazine, pp. 7-28, First Quarter, 2004.
M. Flierl, T. Wiegand and B. Girod, "Rate-constrained multihypothesis prediction for motion-compensated video compression," IEEE trans. on Circuits and Systems for Video Technology, vol. 12, No. 11, pp. 957-969, Nov. 2002.

(Continued)

*Primary Examiner* — David Czekaj
*Assistant Examiner* — David N Werner

(57) ABSTRACT

A method for reducing memory size and amount of data accessed of a buffered-frame storage device in a video codec is provided. It is applicable to a codec compliant with a video encoding and decoding standard. When a block is decompressed, the block is stored in the buffered-frame storage device using either compression data or reconstructed data based on its encoded mode and the positions of its reference frames, or based on a topological pattern and a pre-determined memory capacity constraint. With this method, not only the memory size of the buffered-frame storage device, but also the computational complexity requirement for decoding compression data of reference frames is reduced. The present invention compromises among the buffered-frame memory size, amount of data accessed, and computational complexity requirement.

26 Claims, 17 Drawing Sheets

OTHER PUBLICATIONS

T. Wiegand, X. Zhang and B. Girod, "Long-term memory motin-compensated prediction," IEEE trans. on Circuits and Systems on Video Technology, vol. 9, No. 1, pp. 70-84, Feb. 1999.

M. Budagavi and J. D. Gibson, "Multiframe video coding for improved performance over wireless channels," IEEE trans. on Image Processing, vol. 10, No. 2, pp. 252-265, Feb. 2001.

T. Wiegand, E. Steinbach and B. Girod, "Long-term memory prediction using affine motion compensation," Proceedings of ICIP 99, vol. 1, pp. 51-55, Feb. 1999.

M. Budagavi and J. D. Gibson, "Multiframe block motion compensated video coding for wileless channels," Proceedings of the Thirtieth Asilomar Conference on Signals, Systems and Computer, vol. 2, pp. 953-957, Nov. 1996.

* cited by examiner

| Video sequences / Reference frames | News (%) | Stefan (%) | Forman (%) | Mobile (%) | Average (%) |
|---|---|---|---|---|---|
| Ref(4) | 95.9 | 74.7 | 75.8 | 52.3 | 74.7 |
| Ref(3) | 1.6 | 11.4 | 10.5 | 14.8 | 9.6 |
| Ref(2) | 1.4 | 7.8 | 7.6 | 15.2 | 8.0 |
| Ref(1) | 0.5 | 3.3 | 3 | 9 | 3.9 |
| Ref(0) | 0.6 | 2.8 | 3.1 | 8.7 | 3.8 |

FIG. 6

| Methods<br>Memory sizes | Method A | Method B | Method C | Method D |
|---|---|---|---|---|
| Average no. of frames stored | 2.2 | 2.3 | 2.4 | 3.8 |
| Maximum no. of frames stored | 3.6 | 3.9 | 4.2 | 4.8 |

FIG. 14A

| Schemes<br>Memory sizes and Computational requirement | Scheme 1 | Scheme 2 | Scheme 3 | Scheme 4 | Schemes 5 and 1 | Schemes 5 and 2 | Schemes 5 and 3 | Schemes 5 and 4 |
|---|---|---|---|---|---|---|---|---|
| Average no. of frames stored | 2.2 | 2.5 | 3.2 | 3.3 | 3.2 | 3.2 | 3.4 | 3.3 |
| Maximum no. of frames stored | 3.6 | 3.9 | 4.1 | 4.2 | 4.1 | 4.2 | 4.1 | 4.2 |
| Average no. of MBs have to be decoded for decoding a MB | 38.0 | 33.0 | 5.4 | 4.4 | 2.2 | 1.4 | 2.6 | 2.3 |

FIG. 14B

| Approaches \ Amounts of data accessed | Conventional approach 1 | Invention which does not apply full reconstructed frame | The present invention which applies full reconstructed frame |
|---|---|---|---|
| Frames to be written | 1 | 0.3 | 0.44 |
| Frames to be read | 1 | 0.51 | 0.784 |
| Total frames accessed | 2 | 0.81 | 1.224 |

FIG. 16A

| Approaches \ Amounts of data accessed | Conventional approach 2 | Invention which does not apply full reconstructed frame | The present invention which applies full reconstructed frame |
|---|---|---|---|
| Frames to be written | 1 | 0.3 | 0.44 |
| Frames to be read | 45 | 13.71 | 27.888 |
| Total frames accessed | 46 | 14.01 | 28.328 |

FIG. 16B

METHOD FOR REDUCING BUFFERED-FRAME MEMORY SIZE AND ACCESS IN VIDEO CODEC

FIELD OF THE INVENTION

The present invention generally relates to video codec, and more particularly to a method for reducing the size of a video codec's buffered-frame memory and the amount of data accessed of the buffered-frame memory.

BACKGROUND OF THE INVENTION

In a video compression method, encoded video frames can be categorized, based on how they are encoded, into intra-coded frames (I-frames) and inter-coded frames. Inter-coded frames, based on the prediction direction, can be further categorized into predictive frames (P-frames) and bi-directional predictive frames (B-frames). For I-frames, they are processed using only pixels inside a same frame for prediction (or, for no prediction). The compression achieved thereby is from the spatial relationship of the pixels within the video frame itself. On the other hand, a P-frame is encoded by referencing a previous I- or P-frame for motion estimation, and the generation of motion vectors and residuals. The compression achieved thereby is from the encoding of the motion vectors and residuals. Besides referencing a previous frame, B-frames also reference a subsequent frame for motion estimation. Some video compression standards even conduct prediction for referencing up to previous n frames. H.264 is one of such standards that reference up to previous five frames. For these standards, to encode or decode an inter-coded frame, a buffered-frame storage device of the codec has to store up to n frames. Conventionally, each frame is stored in the buffered-frame storage device using reconstructed data, which requires a large memory size and increases the amount of data accessed of the buffered-frame storage device.

H.264, also known as advanced video coding of MPEG-4 part 10, is the latest video encoding and decoding standard developed by the joint video team (JVT) formed by the video coding experts group (VCEG) of ITU-T and the MPEG group of ISO. The objective of H.264 is to achieve high compression ratios for video applications such as video conferencing, digital storage media, television broadcasting, and internet streaming and communications.

Besides being applied to different applications, H.264 differs from the conventional standards such as H.261, H.263, MPEG-1, and MPEG-2 in the following aspects. H.264 adds intra prediction within intra coding, uses integer transform instead of the discrete cosine transform (DCT), and obtains motion vectors by referencing previous five video frames based on variable-sized blocks. However, as the reference flames are stored in the buffered-frame storage device by their reconstructed data, five frames have to be searched by a H.264 codec so as to locate a mostly resembling reference block for motion estimation during inter coding. This significantly increases not only the memory required for the storage of reference frames, but also the amount of data accessed to the storage device. The H.264 codec therefore consumes a lot of power during its operation.

In 1996, Yogeshwar et al. (U.S. Pat. No. 6,222,886) disclosed a video decoder for compressed video and a related decoding method. As illustrated in FIG. 1, compressed video data are received in a channel buffer 101 and then decompressed by a decoder. A part of the decompressed data is then recompressed again as reference frames. Motion compensation is conducted on a reference frame. At last, regions of interest 103 in the reference frame are decompressed.

The disclosed of Yogeshwar et al. would deteriorate video quality as blocks are re-quantized. The blocks inside the regions of interest 103 are processed to retrieve referenced regions to be decoded.

In 1999, Miller (U.S. Pat. No. 6,633,608) disclosed a method and a device for reducing the memory size and memory bandwidth in a MPEG decoder. FIG. 2 is a flow chart showing the process steps of this conventional method for reducing memory size and bandwidth. As illustrated, within a first mode of operation, the memory is used to store reference frames first (step 201). Afterwards, within a second mode of operation, some of the memory is then used for other purposes (step 210). As the video quality would be deteriorated as the buffered-frame memory is reduced, a frequency domain coding scheme is adopted for compensation. The frequency domain coding scheme is used in conjunction with the buffered-frame memory in the second mode of operation. Besides, the video data are compressed prior to storage and the stored compression data are decompressed prior to utilization. The compression techniques used include down sampling, transforming, etc.

However, the disclosed of Miller didn't address the problem associated with the order of accessing the buffered frames. Miller's approach also causes the video quality to deteriorate, such as the reduction of resolution and Peak Signal-to-Noise Ratio (PSNR). Additionally, both the approaches of Miller and Yogeshwar et al. didn't address the problem of increasing amounts of accessing reference frames. Their approaches didn't cover an adaptive mechanism for determining the storage types of the blocks either.

SUMMARY OF THE INVENTION

The present invention has been made to overcome the drawbacks of large buffered-frame memory and the large amount of data accessed of the buffered-frame storage device when performing motion estimation or compensation in the conventional video codec. The primary objective of the present invention is to provide a method that reduces the size of the buffered-frame memory and the amount of data accessed of the buffered-frame storage device. The method is applicable to a video codec compliant with a video encoding/decoding standard. The video codec contains at least a decision unit and a buffered-frame storage device, which may be an external storage unit, an internal storage unit, or both. The video codec accesses one or more reference frames stored in the buffered-frame storage device in order to perform motion estimation or motion compensation. The method of the present invention comprises the following steps: (a) receiving a compressed frame to be decoded, and the compressed frame includes multiple compressed blocks; (b) determining the size of a storage unit for each compressed block; (c) setting the storage type for each storage unit; and (d) storing each storage unit in the buffered-frame storage device according to its storage type, then returning to step (a) to process the next frame.

The most significant feature of the present invention is that, in order to strike a balance between the buffered-frame memory size and computational requirement, one out of five schemes for determining storage types and one out of four compression data storage methods are determined based on the content of compressed video signals and an estimation to the amount of unused buffered-frame memory before storing the compressed blocks of the currently decoded frame.

Four compression data storage methods are provided. (A) bit streams of residuals and their corresponding prediction parameters (i.e., prediction mode of intra-coding, or motion vectors of inter-coding) before entropy decoding are directly stored in the buffered-frame storage device; (B) residuals after entropy decoding and the corresponding prediction parameters are stored in the buffered-frame storage device; (C) residuals after de-quantization and the corresponding prediction parameters are stored in the buffered-frame storage device; and (D) residuals after inverse transform and the corresponding prediction parameters are stored in the buffered-frame storage device.

Five schemes for determining the storage types are as follows. In scheme (1), subblocks are used as storage units. If a subblock in a MacroBlock (MB) uses prediction based on either intra-coding, or inter-coding which references a near-end frame, the subblock is stored in the buffered-frame storage device using its intra-coding prediction mode and residuals, or inter-coding motion vector and residuals. If the subblock references far-end frames, the subblock is stored using reconstructed data. In scheme (2), macroblocks are used as storage units. If any of the subblocks in a macroblock references far-end frames, the entire macroblock is stored in the buffered-frame storage device using reconstructed data. Only when all subblocks in a macroblocks use prediction based on either intra-coding, or inter-coding which references a near-end frame, then the entire macroblock is stored in the buffered-frame storage device using intra-coding prediction and residual, or inter-coding prediction and residual. In scheme (3), a topological pattern is established which includes default storage types for the macroblocks in the frame to be decoded. Subblocks are used as storage units. Then, for each subblock, its storage type based on scheme (1) is compared with the default storage type of a corresponding macroblock in the topological pattern. Only when both the storage type based on scheme (1) and the default storage type are using compression data, then the storage type for the subblock is using compression data; otherwise, it is using reconstructed data. In scheme (4), a topological pattern is established as in scheme (3). Macroblocks are used as storage units. Then, for each macroblock, its storage type based on scheme (2) is compared with the default storage type of a corresponding macroblock in the topological pattern. Only when both the storage type based on scheme (2) and the default storage type of topological pattern are using compression data, then the storage type for the macroblock is using compression data; otherwise, it is using reconstructed data. In scheme (5), a memory capacity is given as a constraint. If required, the currently decoded frame is supplied in the buffered-frame memory using reconstructed data at appropriate times, so as to use the memory of the buffered-frame storage device as much as possible within a given memory capacity constraint. When the memory occupied by reference frames in the buffered-frame storage device is compliant with a given memory constraint, a full or partial of the currently decoded frame is stored in the buffered-frame memory device using reconstructed data; otherwise, the blocks of the frame to be decoded are stored according to the result of schemes (1)-(4).

Experiment results have shown that, in the Foreman sequence, with compared to the conventional codec's storage of up to 5 frames stored as reconstructed data, the four methods (A), (B), (C), and (D), along with scheme (1) on the average require only 2.2, 2.3, 2.4, and 3.8 frame sizes to store 5 reference frames, and, in the worst condition, requires 3.6, 3.9, 4.2, and 4.8 frame sizes to store 5 reference frames, respectively. On the other hand, when using schemes (1)-(4) along with method (A), on the average only 2.2, 2.5, 3.2, and 3.3 frame sizes, and in the worst case only 3.6, 3.9, 4.1, and 4.2 frame sizes, respectively, are required to store 5 reference frames. As to the computational requirement, method (A) along with schemes (1) and (5) requires only $\frac{1}{15}$ of the computation required by using the method (A) together with scheme (1) only.

Accordingly, the present invention indeed reduces effectively the memory size and the amount of data accessed of the buffered-frame storage device. Not only the memory usage is adapted to the video characteristics, but also some portions of the reference frames are stored using reconstructed data. Computation is reduced when these portions are referenced from the blocks of a decoded frame and no re-decompression is required.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 5 is a schematic diagram showing a H.264 video encoder that the present invention is applied in.

FIG. 6 is a table showing the probabilities of blocks of the decoded frames forward referencing the previous five frames when a H.264 decoder conducts decompression and motion compensation for four different video sequences.

FIG. 14A is a comparison table showing the memory required for a Foreman sequence under the storage types determined by scheme (1) and the four compression data storing methods (A), (B), (C) and (D).

FIG. 14B is a comparison table showing the memory and computational complexity required for a Foreman sequence under the storage types determined by schemes (1)-(5) and the compression data storing method (A).

FIG. 16A is a table comparing, under P=70%, the amount of data accessed by a decoder between using a conventional approach which stores five reference flames using reconstructed data in the external storage unit and using the present invention with or without scheme (5) which supplies and does not supply a full frame stored as reconstructed data into an internal or external storage unit.

FIG. 16B is a table comparing, under P=70%, the amount of data accessed by an encoder between using a conventional scheme which stores reference frames using reconstructed data in the external storage unit and using the present invention with or without scheme (5) which supplies and does not supply a full frame stored as reconstructed data into an internal or external storage unit.

DETAILED DESCRIPTION OF THE PREFERRED EMBODIMENTS

Figure 1:
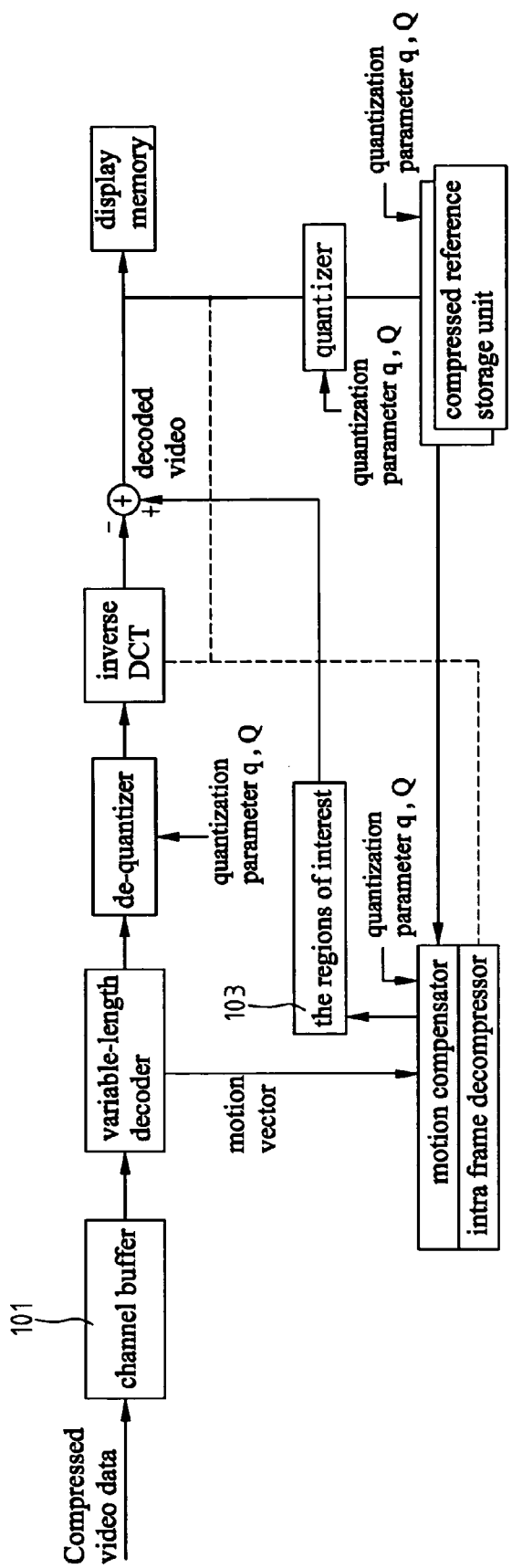
FIG. 1 shows a conventional video decoder.
Figure 2:
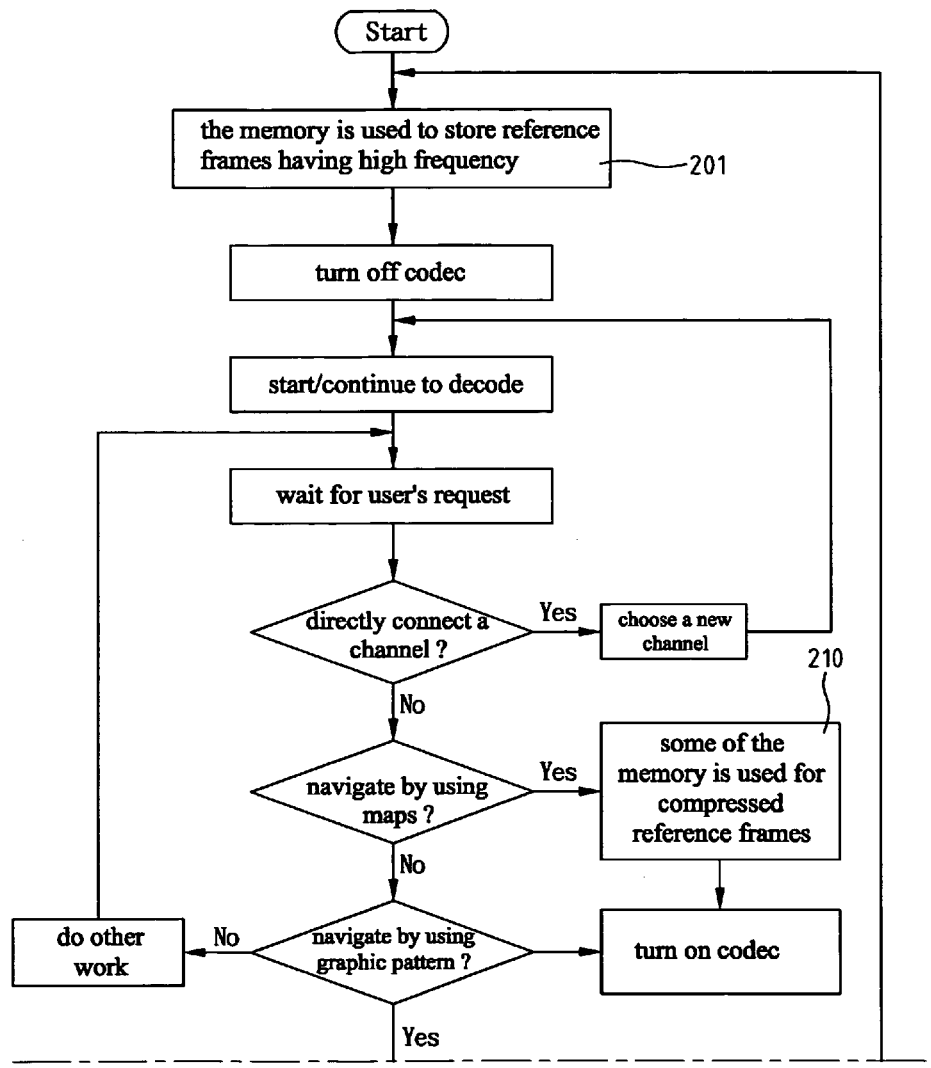
FIG. 2 is a flow chart showing a conventional method for reducing buffered-frame memory size and memory bandwidth.
Figure 3:
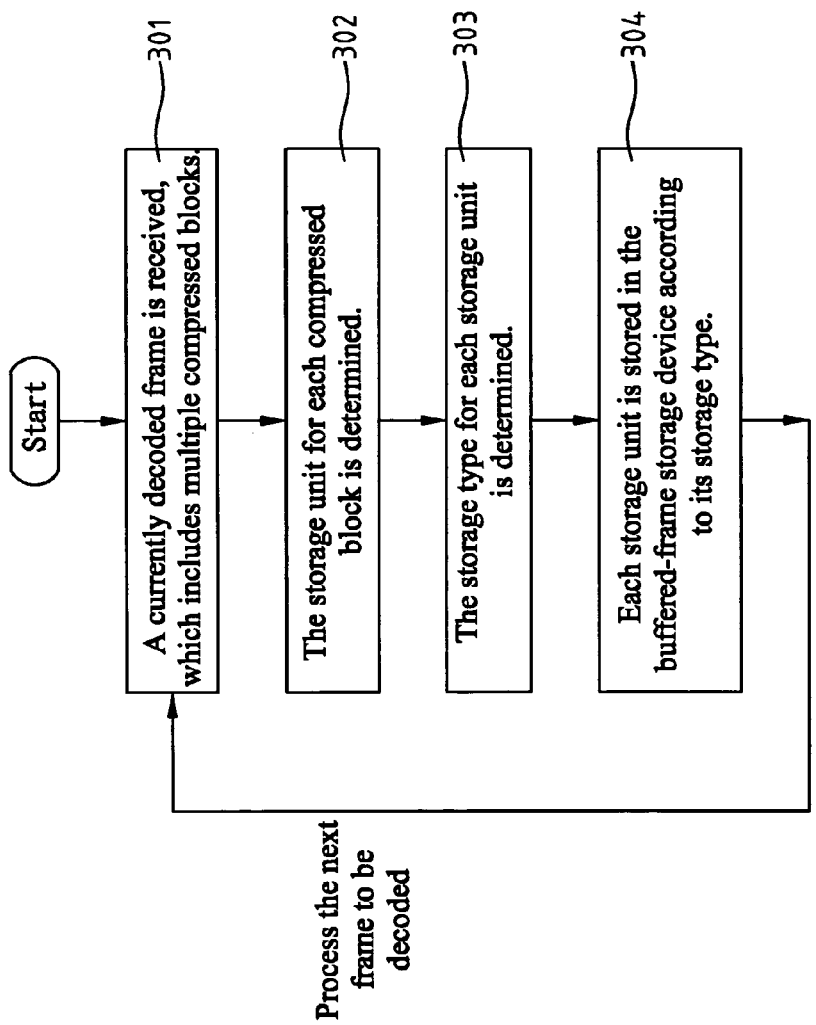
FIG. 3 is a flow chart showing a method for reducing the memory size and the amount of data accessed of the buffered-frame storage device according to the present invention.

FIG. 3 is a flow chart showing a method for reducing the memory size and the amount of data accessed of a buffered-frame storage device according to the present invention. The method is applicable to a video codec in accordance to a video encoding/decoding standard. The method utilizes one or more reference frames stored in the buffered-frame storage device for motion estimation or compensation. Referring to FIG. 3, the bit stream of the currently decoded frame is received, which includes multiple compressed blocks as described in step 301. Then, in step 302, the storage unit for each compressed block is determined. The storage type for each storage unit is determined in step 303. Finally, in step 304, each compressed block is stored in the buffered-frame storage device according to its storage type, then returns to step 301 to process the next frame to be decoded.

Figure 4:
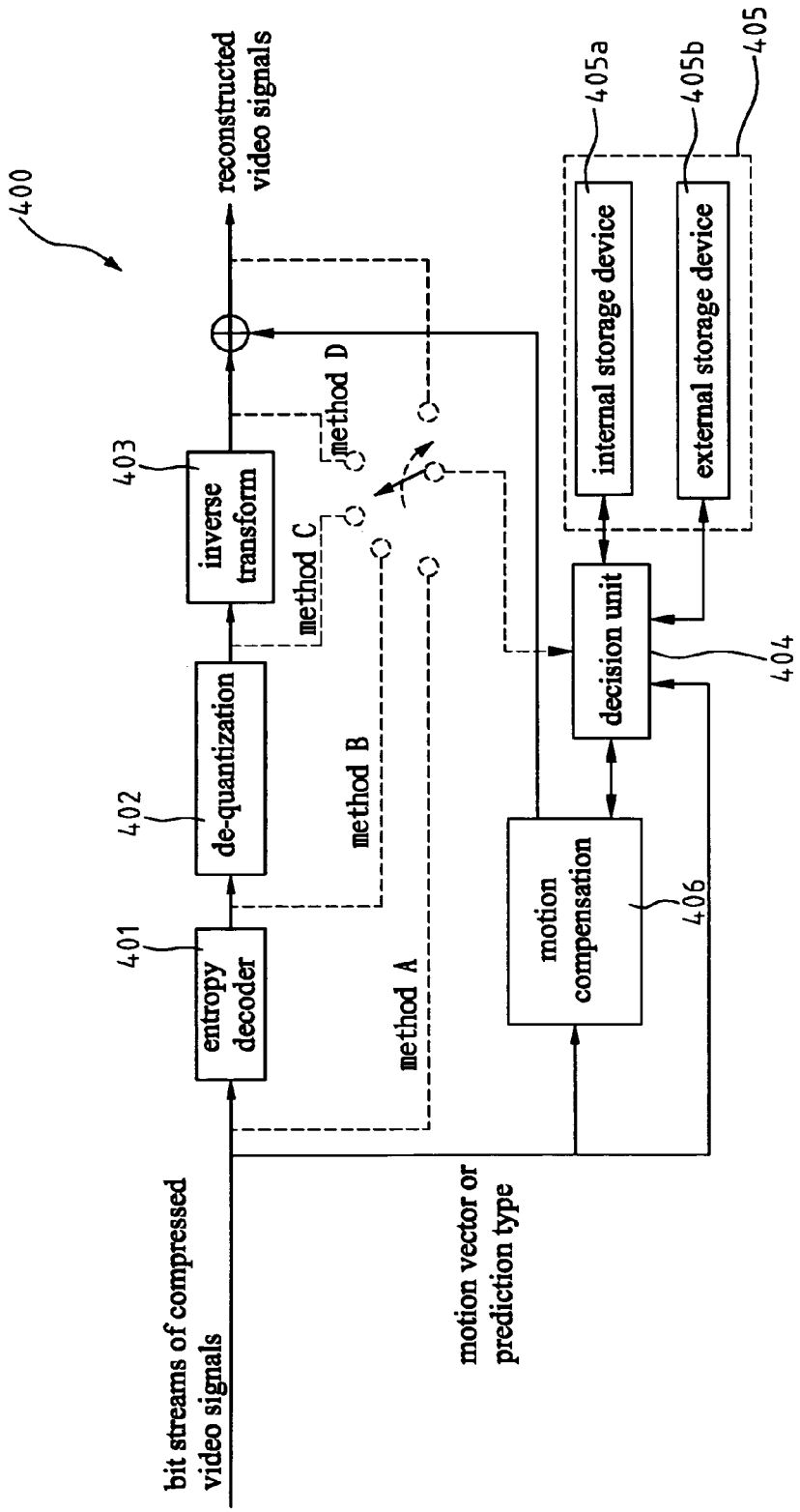
FIG. 4 is a schematic diagram showing a video decoder enforcing the method of FIG. 3.

FIG. 4 is a schematic diagram showing a video decoder enforcing the method of FIG. 3. The video decoder 400 comprises at least an entropy decoder 401, a de-quantization device 402, an inverse transform device 403, a decision unit 404, an intra or inter prediction and motion compensation unit 406, and a buffered-frame storage device 405 which may be an internal storage unit 405a, an external storage unit 405b, or both. According to the system's memory and computation capacities, the decision unit 404 determines an appropriate scheme out of five schemes for storage type decision and a compression data storage method out of four compression data storage methods and, then, stores the compressed blocks as reference frames in the external storage unit 405b or the internal storage unit 405a.

Without losing the generality, the H.264 video encoding standard is adopted as an example for a detailed description to the present invention as follows.

Figure 5:
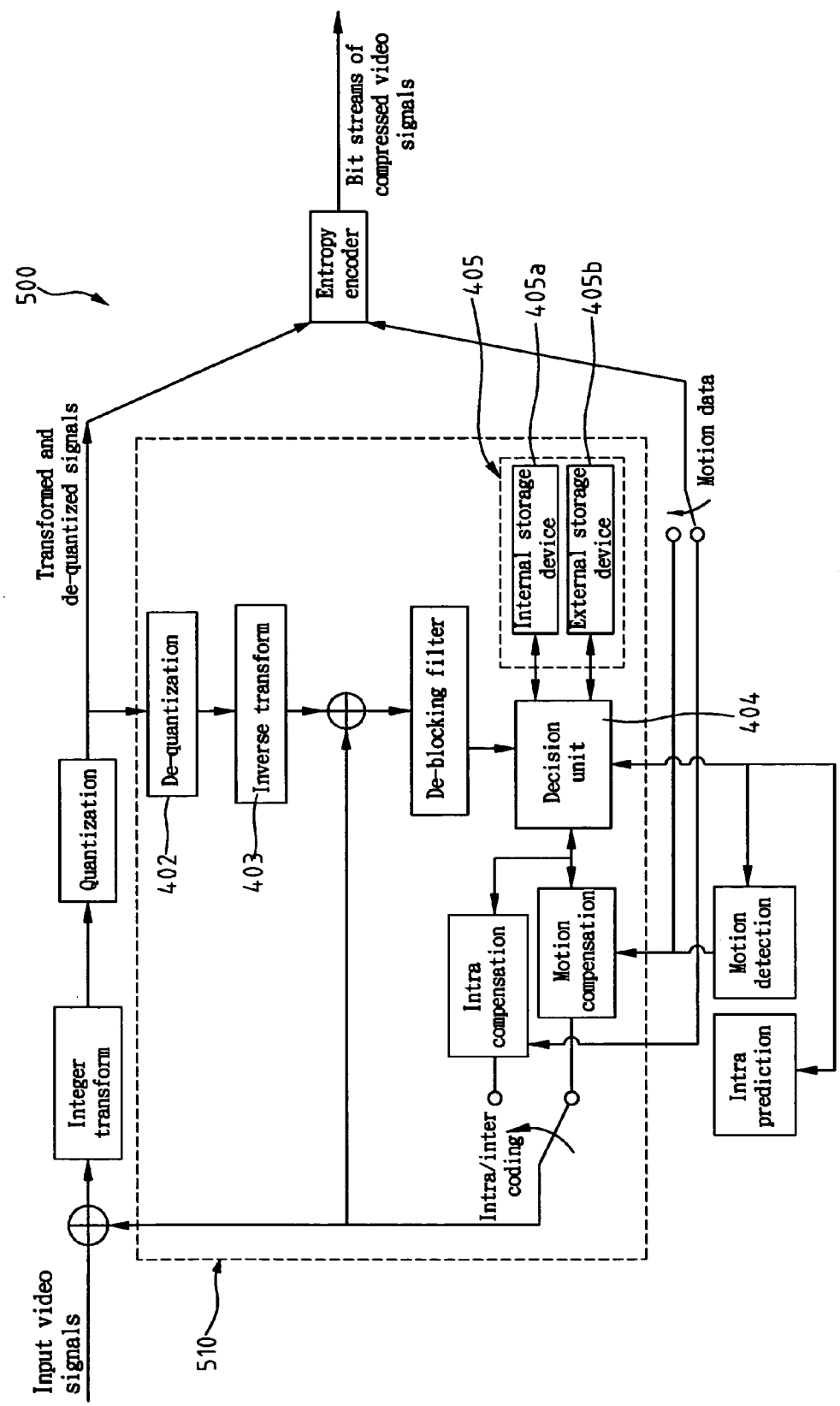

FIG. 5 is a schematic diagram showing a H.264 video encoder that the present invention is applied in. As illustrated, since the video encoder 500 also contains a partial decoder 510, the method of the present invention is applicable to the encoder 500's decision unit 404 and buffered-frame storage device 405. The buffered-frame storage device 405 may be an internal storage unit 405a, an external storage unit 405b, or both. According to the system's memory and computing capacities, the decision unit 404 of the encoder 500 determines an appropriate compression data storage method and a scheme for determining the storage type and, then, stores the blocks in the external storage unit 405b or the internal storage unit 405a.

FIG. 6 is a table showing the probabilities of blocks of decoded frames forward referencing the previous five frames when a H.264 decoder conducts decompression and motion compensation for four different video sequences. In the table, Ref(4) refers to the near-end reference frame immediately adjacent to the currently decoded frame while Ref(3), Ref(2), Ref(1), and Ref(0) refer to the reference frames in increasing distance to the currently decoded frame in this order.

From the table of FIG. 6, it can be seen that, when a block of forward prediction is decoded, its motion vector has a probability greater than 70% to reference the nearest Ref(4) frame, and the probability decreases proportionally for reference frames at increasing distances from the currently decoded frame. Accordingly, if a reference frame close to the currently decoded frame is stored using motion vector and residual, and if the reference frame far from the frame to be decoded is stored using reconstructed data, as such, memory for the storage of these reference frames can be significantly reduced since the majority of the blocks of the reference frames are stored using compressed data. Secondly, in the compression process of a video encoder which requires access to the stored reference frames in order to find a most appropriate motion vector for motion estimation, the amount of data accessed by the video encoder to the buffered reference frame is also significantly reduced, thereby reducing the power consumption of the video encoder.

Figure 7:
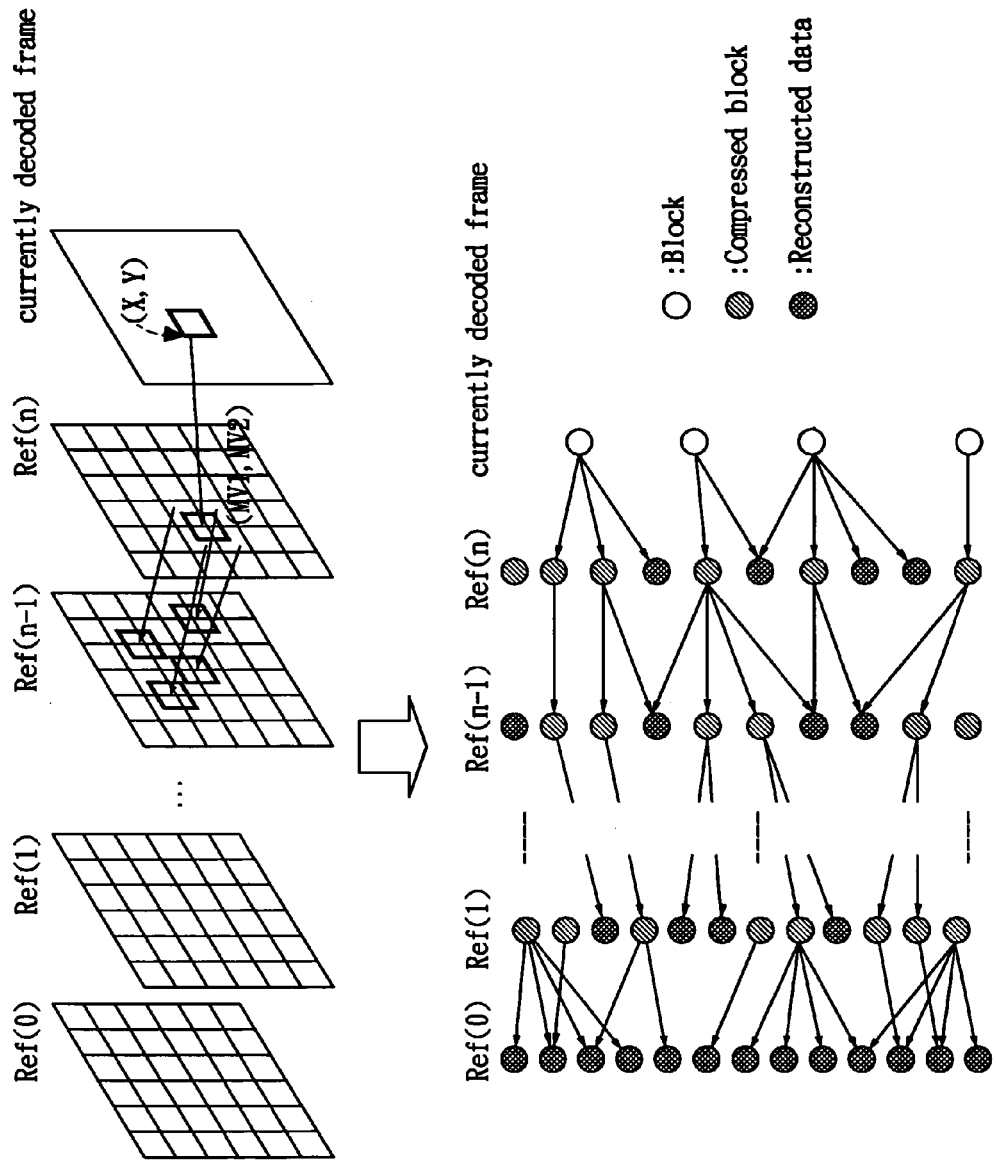
FIG. 7 is a schematic diagram showing the arrangement of n previous frames in the buffered-frame storage device referenced by a block of forward prediction in the currently decoded frame.

To store some of the reference frames using their compressed data, whether these frames can be reconstructed successfully should also be taken into consideration, in addition to their relative positions to the currently decoded frame. FIG. 7 is a schematic diagram showing the arrangement of n previous frames in the buffered-frame storage device referenced by a block of forward prediction in a currently decoded frame. As the motion vector of forward prediction of a block is based on a block in the previous n frames which has the minimum error, and when one of the previous n frames is stored using its compressed data, the compressed blocks in this one reference frame have to be decoded before being used for the forward-prediction decoding of the block in the currently decoded frame. Furthermore, to decode the compressed blocks in a reference frame, there should be at least a reference frame stored using reconstructed data or using intra-coding among the stored reference frames. In addition, if the motion vector is based on forward prediction, the reference frame stored using reconstructed data or using intra-coding has to be at a position farthest away from the currently decoded frame so that all reference frames in between could be decoded successfully.

What should also be taken into consideration is that, if a block in a reference frame is stored using motion vector and residual and if the motion vector does not reference the adjacent near-end reference frame, the decoding of the block would fail as what is required for the decoding process is not present in the stored reference frames. To prevent this situation, a block is stored using motion vector and residual only when the motion vector refers to the adjacent near-end frame, otherwise, the block is stored using reconstructed data.

Based on the foregoing description, using the frame order in FIG. 7 as an example, the method of the present invention stores the Ref(0) frame (i.e., frame 0 in the buffered-frame storage device) using reconstructed data or intra-coding compression data (i.e., intra-frame prediction mode and residual). As to the other frames, their storage types are based on whether their blocks refer to the adjacent reference frames. If a block in a frame refers to its adjacent near-end frame, the block is stored using motion vector and residual. On the other hand, if the block does not refer to its adjacent near-end frame, the block is stored using its reconstructed data. In this manner, not only the memory required for the storage of the reference frames is reduced, but also the problem associated with frame orders when decoding blocks in reference frames is resolved.

Figure 8:
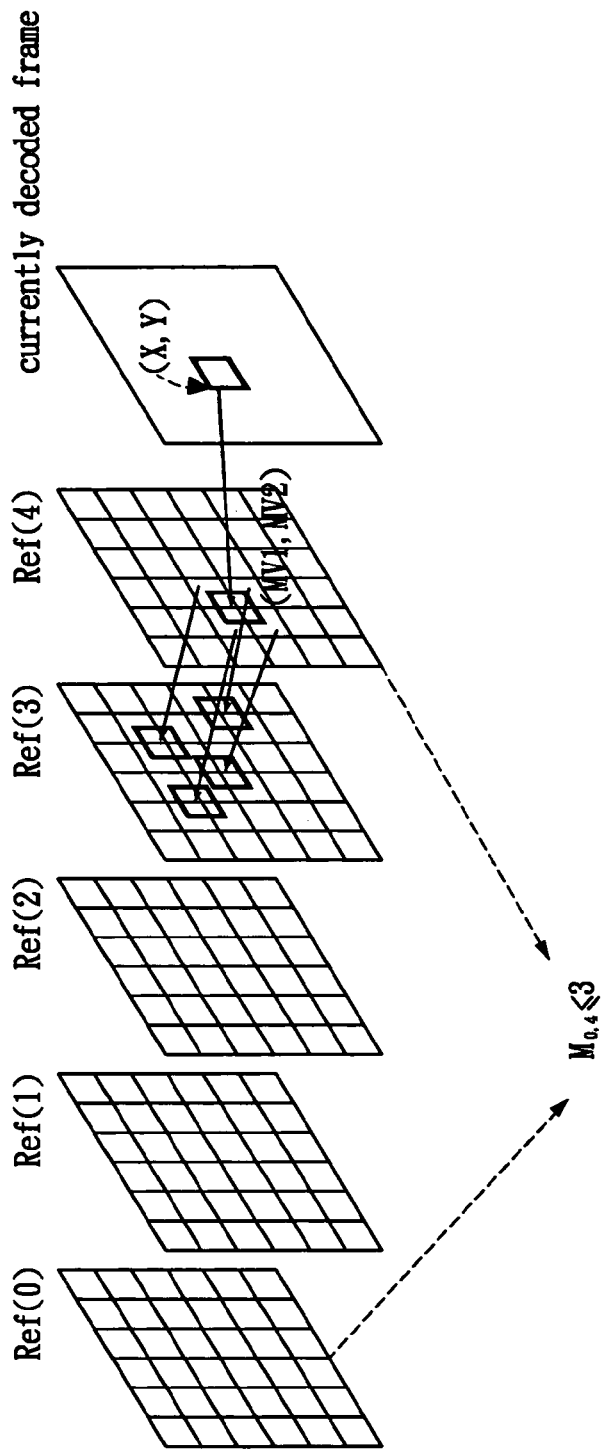
FIG. 8 is a schematic diagram showing five reference frames stored in a buffered-frame storage device of a H.264 video decoder.

FIG. 8 is a schematic diagram showing five references frames stored in a buffered-frame storage device of a H.264 video decoder. As illustrated, blocks of Ref(0) frame must be stored using reconstructed data or intra-coding compression data. The blocks of the other frames Ref(1)-Ref(4) are stored based on what frames are referenced during their inter-predictive coding. If a block is predicted based on the previous adjacent near-end frame or encoded based on intra-coding prediction, the block is stored using its compressed data. If a block is predicted based on previous far-end frames, the block is stored using its reconstructed data. As most of blocks in reference frames are stored with their compressed data that takes up much less memory space, the method therefore indeed achieves the objective of reducing the memory size for decoder's buffered-frame storage device.

In step 302 of the present invention (see FIG. 3), each of the compressed blocks has its storage unit determined to be either macroblock or subblock (more details will be given later).

Figure 9:
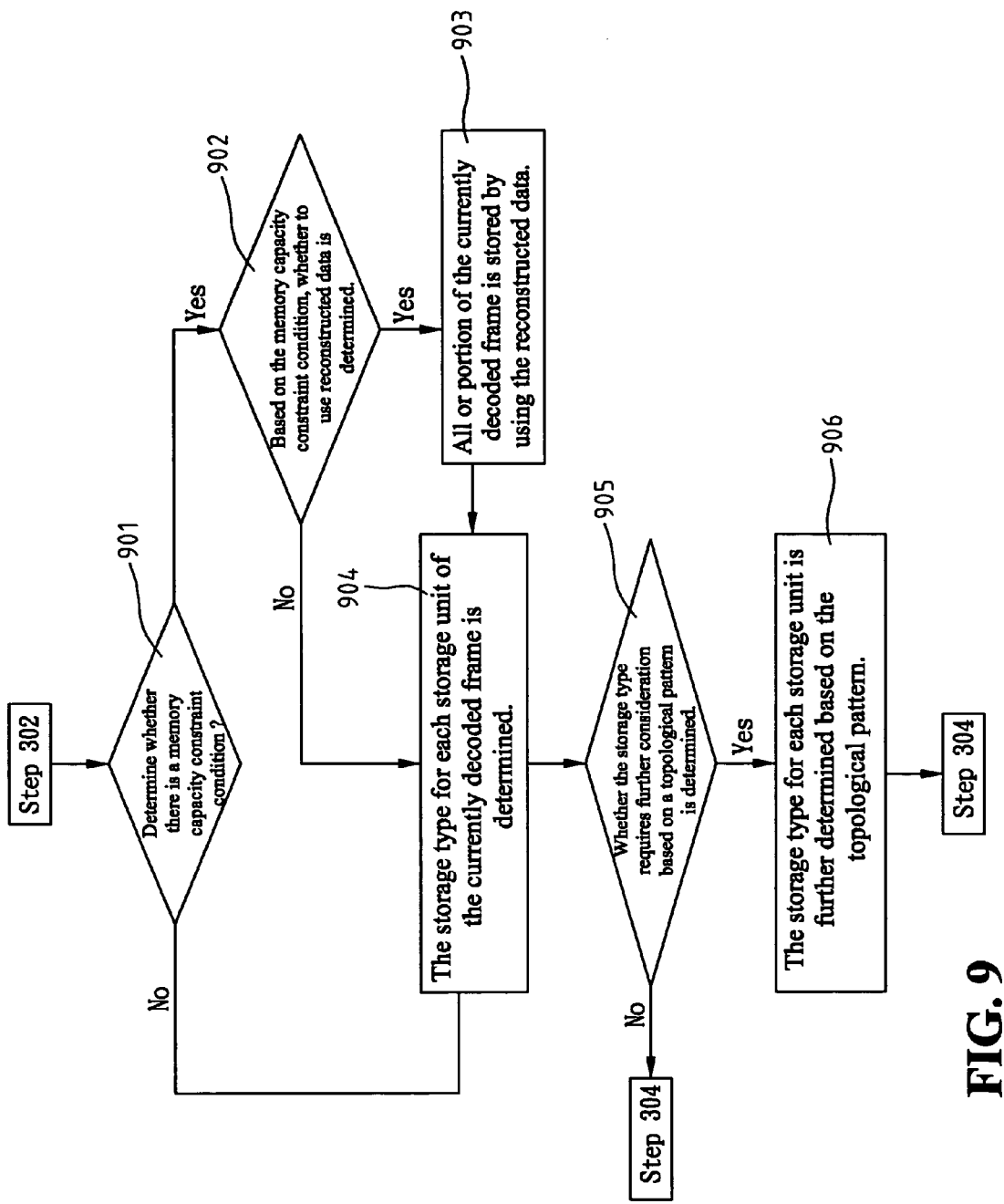
FIG. 9 is a flow chart showing the process of determining the storage type of each storage unit in FIG. 3.

FIG. 9 is a flow chart showing the process of determining the storage type of each storage unit in step 303 of FIG. 3. As illustrated, step 901 first determines whether there is a memory capacity constraint condition. If not, the flow goes to step 904; otherwise, the flow continues to step 902. In step 902, based on the memory capacity constraint condition, whether to supply reconstructed data is determined. If not, the flow goes to step 904; otherwise, the flow continues to step 903, which stores the frame as reconstructed data. In step 904, the storage type for each storage unit of the frame to be decoded is determined. In step 905, whether the storage type requires further consideration based on a topological pattern is determined. If not, the flow goes to step 304; otherwise, the storage type for each storage unit is further determined based on the topological pattern in step 906. At last, the flow continues to step 304.

Figure 10:
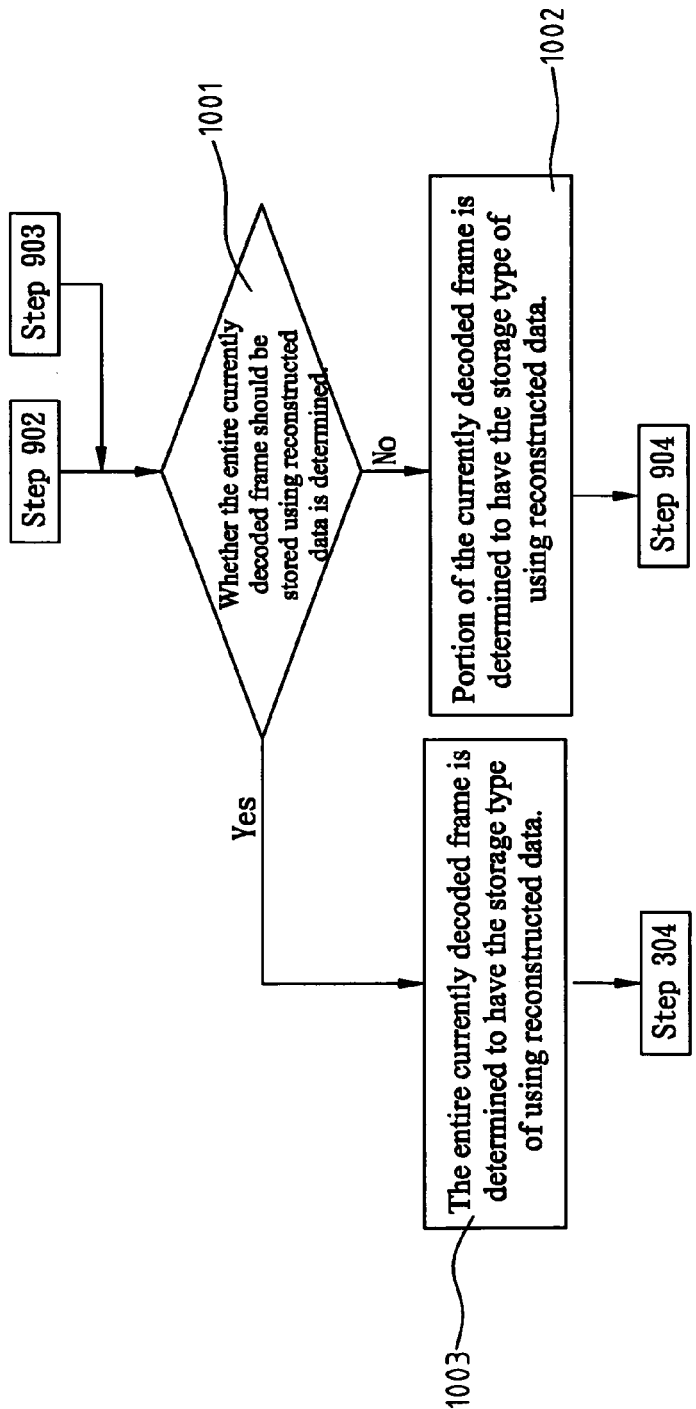
FIG. 10 is a flow chart showing the detail process for applying the reconstructed data, in accordance with FIG. 9.

FIG. 10 is a flow chart showing the detail process for storing the frame as reconstructed data, in accordance with step 903 of FIG. 9. As illustrated, in step 1001, whether the entire currently decoded frame should be stored using reconstructed data is determined. If yes, the follow goes to step 1003; otherwise, the flow continues to step 1002. In step 1002, portion of the currently decoded frame is determined to have the storage type of using reconstructed data. The flow then continues to step 904. In step 1003, the entire currently decoded frame is determined to have the storage type of using reconstructed data. The flow then goes to step 304.

Figure 11:
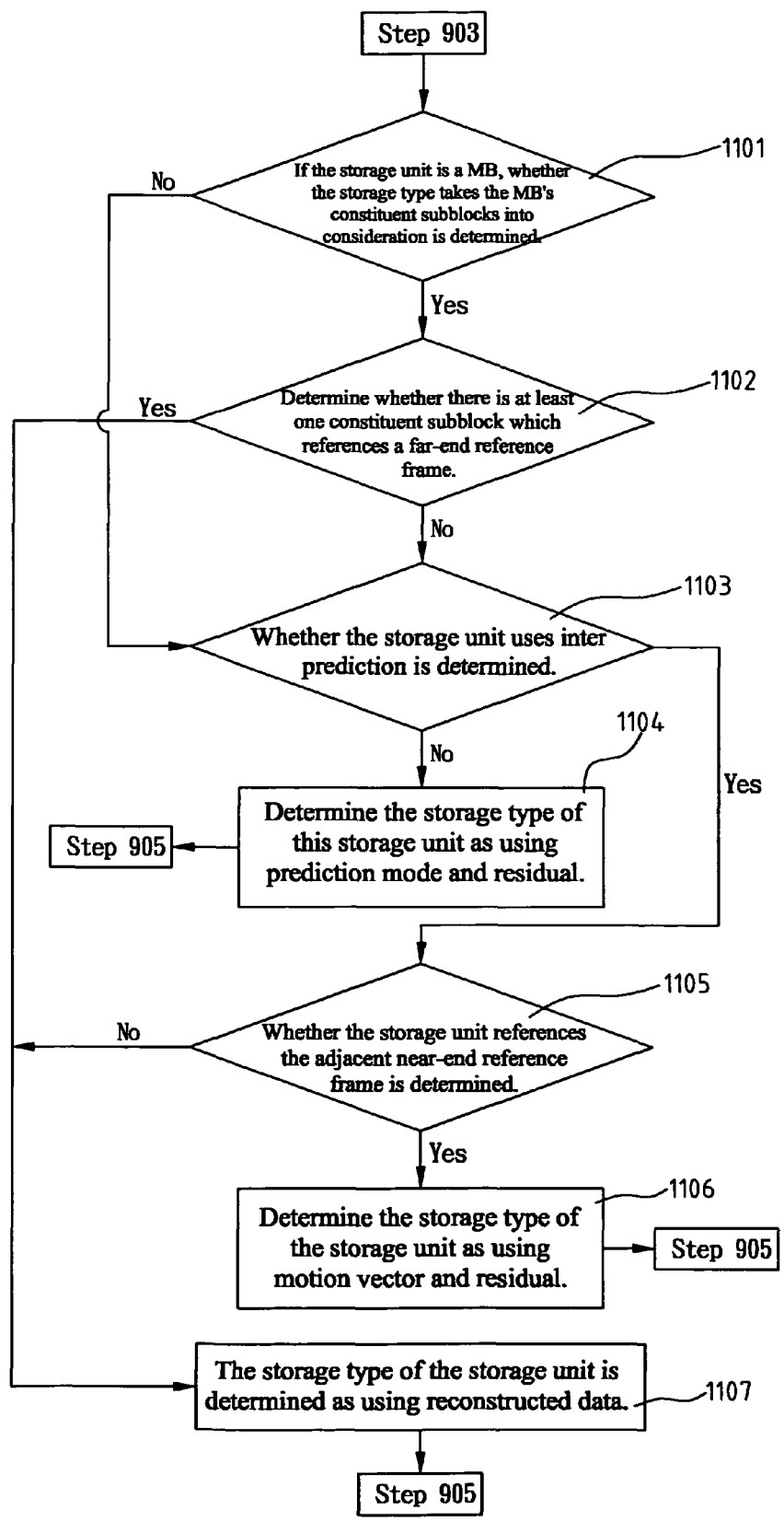
FIG. 11 is a flow chart showing the detail process of determining the storage type for each storage unit of the currently decoded frame, in accordance with FIG. 9.

FIG. 11 is a flow chart showing the detail process of step 904 of FIG. 9 for determining the storage type of each storage unit of the currently decoded frame. As illustrated, in step 1101, if the storage unit is a macroblock, whether the storage type takes subblocks of a macroblock into consideration is determined. If not, the flow goes to 1103; otherwise, the flow continues to step 1102, which determines whether there is at least one constituent subblock which references a far-end reference frame. If yes, the flow goes to step 1107; otherwise, the flow continues to step 1103. In step 1103, whether the storage unit uses inter prediction is determined. If yes, the flow goes to step 1105; otherwise, the flow continues to step 1104, which determines the storage type of this storage unit as using prediction mode and residual. The flow then goes to step 905. In step 1105, whether the storage unit references the adjacent near-end reference flame is determined. If not, the flow goes to step 1107; otherwise, the flow continues to step 1106, which determines the storage type of the storage unit as using motion vector and residual. The flow then goes to step 905. In step 1107, the storage type of the storage unit is determined as using reconstructed data. The flow then goes to step 905.

Figure 12:
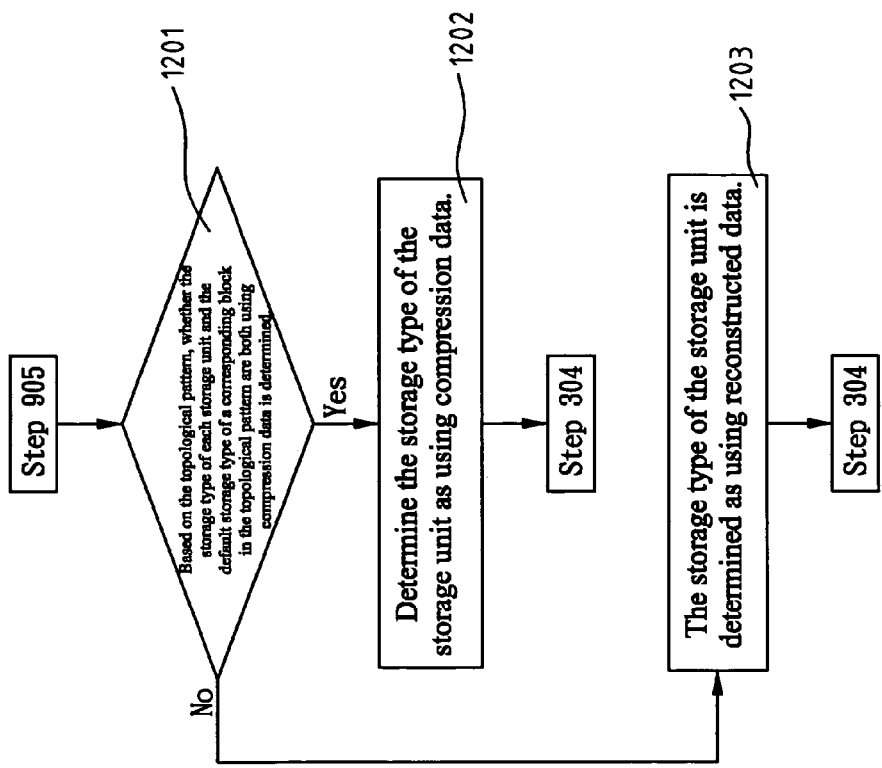
FIG. 12 is a flow chart showing the process of further determining the storage type for each storage unit of the currently decoded frame, based on a topological pattern in accordance with FIG. 9.

FIG. 12 is a flow chart showing the detailed process in step 906 of FIG. 9 for further determining the storage type of each storage unit of the frame to be decoded, in accordance with a topological pattern. As illustrated, in step 1201, based on the topological pattern, whether the storage type of each storage unit and the default storage type of a corresponding block in the topological pattern are both stored using compressed data is determined. If no, the flow goes to step 1203; otherwise, the flow continues to step 1202, which determines the storage type of the storage unit stored using compression data. The flow then goes to step 304. In step 1203, the storage type of the storage unit is determined as to be stored using reconstructed data. The flow then goes to step 304.

Based on the foregoing method of reducing memory size and amount of data accessed according to the present invention, the present invention utilizes five schemes to determine the storage type. Within a H.264 video codec, each macroblock could be divided to subblocks with various sizes such as 16×8, 8×16, 8×4, 4×8, or 4×4 pixels. In the following, how the five schemes determine storage type for a block is described in details.

In scheme (1), subblocks are used as storage units for the flame to be decoded. If the subblocks in a MB use prediction based on either intra-coding or inter-coding which references an adjacent near-end frame, the subblocks are stored in the buffered-frame storage device using intra-coding prediction mode and residual, or inter-coding motion vector and residual. If the subblocks reference far-end frames, they are stored using reconstructed data.

In scheme (2), MBs are used as storage units for the flame to be encoded. For a 16×16-pixel MB in the currently decoded frame, if any subblock in the 16×16 MB references far-end frames, the MB is stored in the buffered-frame storage device using reconstructed data. Only when all subblocks in a MB use prediction based on either intra-coding, or inter-coding which references an adjacent near-end frame, then the entire MB is stored in the buffered-flame storage device using intra-coding prediction mode and residual, or inter-coding prediction motion vector and residual.

Figure 13:
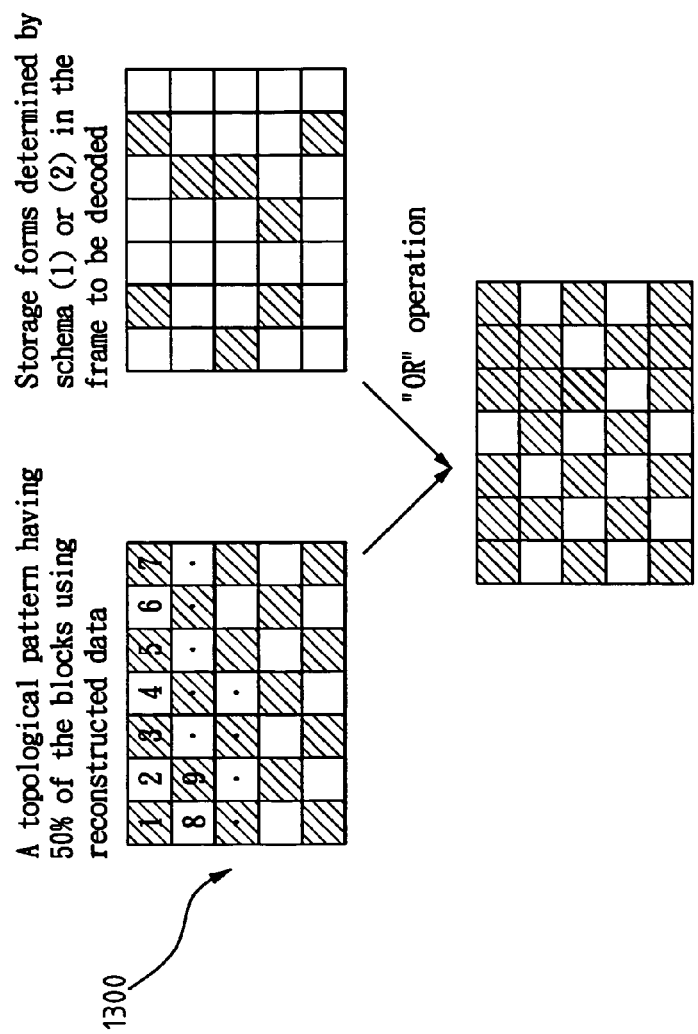
FIG. 13 is a schematic diagram showing the application of scheme (3) or (4) to determine the storage type for the currently decoded frame.

FIG. 13 is a schematic diagram showing the application of scheme (3) or (4) to determine the storage type of blocks or macroblocks in the currently decoded flame. In scheme (3), a topological pattern is established which includes default storage types for the blocks in the currently decoded frame. As illustrated in FIG. 13, a topological pattern 1300 having 50% of MBs stored as reconstructed data is used as an example. In the topological pattern 1300, the storage type for the first block is using reconstructed data, the second block is using compressed data (motion vector and residual), the third block is using reconstructed data, and the fourth is using compressed data, and so on. In scheme (3), subblocks are used as storage units for the currently decoded flame. Then, for each subblock, its storage type based on scheme (1) is compared with the default storage type of a corresponding block in the topological pattern. Only when both the storage type based on scheme (1) and the default storage type of the topological pattern are using compressed data, then the storage type for the subblocks is determined as using compressed data; otherwise, it is determined as using reconstructed data.

In scheme (4), a topological pattern similar to scheme (3) is established and MBs of the currently decoded frame are used as storage unit. Then, similarly, for each MB of the currently decoded flame, its storage type based on scheme (2) is compared with the default storage type of a corresponding MB in the topological pattern and the final storage type for the MB is determined identically to scheme (3).

In scheme (5), based on a given memory capacity constraint condition, a flame is stored using reconstructed data at appropriate times so as to use the memory of the internal storage unit 405a and external storage unit 405b as much as possible within the given memory capacity constraint. In other words, the memory capacity $M_{0,n-1}$ for all the reference frames between frame 0 and frame N−1 is constrained to be less than or equal to a predetermined threshold, which is the memory capacity for storing the reconstructed data of (N-L-1) frames. L stands for the number of frames to be deducted.

Using FIG. 8 as an example and assuming that the memory capacity constraint condition is for holding up to the amount of 3 uncompressed frames and $M_{i,j}$ stands for the memory required for storing reference frames from reference frame i to reference frame j, then, when the memory of the buffered-frame storage device 405 used for the storage of reference frames satisfies $M_{0,4} \leq 3$ (using an uncompressed frame as unit), the entire currently decoded frame or some portion of it is stored using reconstructed data; otherwise, using schemes (1)-(4) for determining the storage type for the blocks in the currently decoded frame.

In addition to the forgoing five schemes, the present invention further provides four methods for storing compression data so as to strike a balance during video decoding between reducing the memory size for the buffered-frame storage device 405 and reducing the computational requirement for reconstructing the blocks of the reference frames. The four methods are applicable to a H.264 video codec as illustrated in FIG. 4. The four methods are described in details as follows.

In method (A), the bit streams for block residuals and their corresponding prediction parameters before the entropy encoder 401 is stored in the buffered-frame storage device 405. As the block residuals stored using this method are compressed bit streams, only a very small amount of memory is used. However, more computation is required for the decoding.

In method (B), the residuals after the entropy decoding by the entropy decoder 401 has most of the non-zero coefficients at low frequencies and, after some simple processing, are stored in the buffered-frame storage device 405 (the corresponding prediction parameters are already stored in the buffered-frame storage device 405). This method may reduce both the computational requirement and memory size.

In method (C), the residuals after de-quantization by the de-quantization device 402, after some simple processing, are stored in the buffered-frame storage device 405 (the corresponding prediction parameters are already stored in the buffered-frame storage device 405). This method may also reduce both the computational requirement and memory size.

In method (D), the residuals after inverse transform by the inverse transform device 403, and after some simple processing, are stored in the buffered-frame storage device 405 (the corresponding prediction parameters are already stored in the buffered-frame storage device 405). This method achieves less saving in terms of memory size, but it requires the least computation for decoding blocks in the reference frames.

In the H.264 codec, the decision unit 404 is responsible, based on the memory size and computational requirements, for determining an appropriate scheme for deciding the storage type and an appropriate method for storing the compression data.

FIG. 14A is a comparison table showing the memory usage for a Foreman sequence under the storage forms determined by scheme (1) and the four compression data storing methods (A), (B), (C) and (D).

As illustrated in FIG. 14A, in contrast to the conventional codec storing 5 reference frames using reconstructed data, the four methods (A), (B), (C) and (D) on the average requires only 2.2, 2.3, 2.4, and 3.8 frame sizes to store 5 reference frames, and, in the worst condition, requires 3.6, 3.9, 4.2, and 4.8 frame sizes to store 5 reference frames.

FIG. 14B is a comparison table showing the memory and computation usages for a Foreman sequence under the storage types determined by schemes (1)-(5) and the compressed data storing method (A).

As illustrated, when using schemes (1)-(4) to determine storage types and using method (A) for storing compression data, on the average only 2.2, 2.5, 3.2, and 3.3 frame sizes, and in the worst case only 3.6, 3.9, 4.1, and 4.2 frame sizes, respectively, are required to store 5 reference frames. As to the computational complexity, it is calculated based on, in order to decode a block, how many MBs have to be decoded. According to the table in FIG. 14B, to decode a MB, schemes (1)-(4) on the average have to decode 38.0, 33.0, 5.4, and 4.4 MBs respectively. According to these results, scheme (1) uses the least amount of memory but requires the greatest amount of computation for decoding. In contrast, scheme (4) requires less computational complexity but the saving on the memory is not as great as scheme (1).

Observing the memory usages of various schemes and using the result of method (A) and scheme (1) shown in FIG. 14B as an example, storing 5 reference frames requires memory for 2.2 frame sizes on the average. For some video segments, storing 5 reference frames would require memory for at most 3.6 frame sizes. Obviously, there are video segments that do not require much memory and some memory therefore is a waste. The present invention therefore adopts scheme (5) along with schemes (1)-(4) to make a good use of the memory under a given capacity.

Please refer to FIG. 14B again. Comparing with the results from method (A) along with schemes (1)-(4), the addition of scheme (5) reveals more efficient memory usage. In addition, the number of referenced blocks for reconstruction is reduced significantly, contributing to the reduction of computational complexity required as well. For example, method (A) along with schemes (1) and (5) requires only 1/15 of the computation required by the method (A) and scheme (1).

Figure 15:
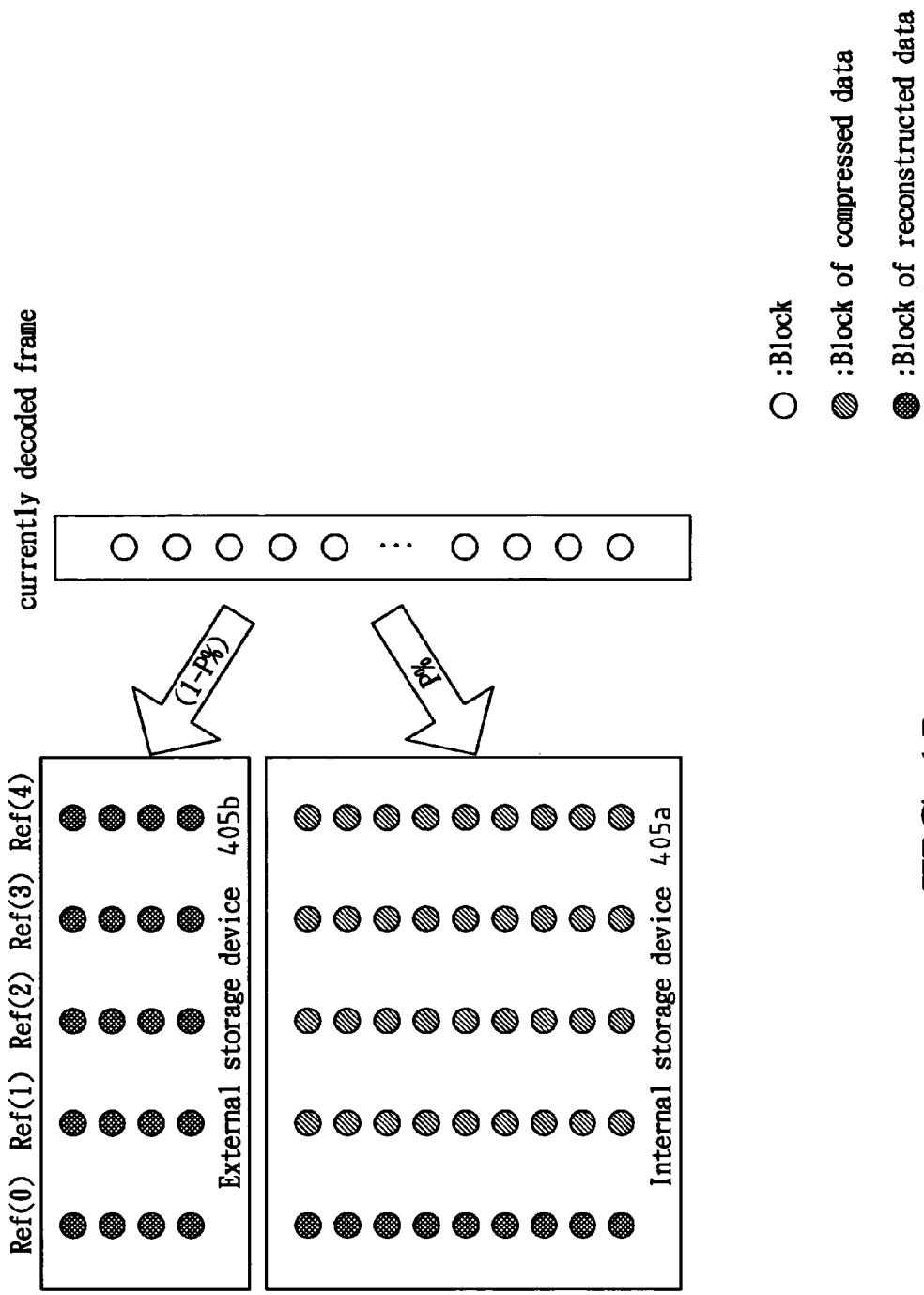
FIG. 15 is a schematic diagram showing the storage of blocks of reference frames in a video codec so as to reduce the amount of data accessed between the video codec and the external storage unit for motion estimation or motion compensation.

FIG. 15 is a schematic diagram showing the storage of blocks of reference frames in a video codec so as to reduce the amount of data accessed between the video codec and the external storage unit for motion estimation or motion compensation. In FIG. 15, it is assumed that a frame, after the storage types of its blocks have been determined, has P % of the blocks stored in the internal storage unit 405a using compressed data and (1-P %) of the blocks stored in the external storage unit 405b using reconstructed data. For the reference frames of FIG. 7, therefore, Ref(1)~Ref(4) has P % of their blocks stored in the processor's internal storage unit 405a using compressed data while (1-P %) of their blocks stored in the external storage unit 405b using reconstructed data. Ref (0) has P % of its blocks in the processor's internal storage unit 405a and (1-P %) of its blocks in the external storage unit 405b, all using reconstructed data. In this way, a decoded frame only requires (1-P %) blocks of reconstructed data to be written out to the external storage unit 405b and, similarly, decoding some related blocks requires also reading (1-P %) blocks of reconstructed data from the external storage unit 405*b*. In addition, since the farthest reference frame Ref (0) has P % of its blocks in the processor's internal storage unit 405*a* using reconstructed data. In order to decode the reference frame Ref (1) to be fully reconstructed and to replace the Ref (0), only ((1-P %)×P %) blocks have to be read from the external storage unit 405*b*, and only (P %)×(P %) blocks are accessed to the internal storage unit 405*a* inside the processor. As such, the amount of data accessed between the codec's processor and its external storage unit 405*b* is further reduced, and the codec's power consumption is thereby reduced as well. If a video sequence has 70% of the blocks being compression data and 30% of the blocks being reconstructed data, and 5 reference frames being stored entirely with their reconstructed data in the external storage unit 405*b*, for performing motion compensation for the blocks of every currently decoded frame, it is required to read in a frame of reconstructed data and to write a frame of reconstructed data between the processor and the external storage unit 405*b*. If the present invention is applied in the storage of the reference frames, then only 0.3 frames of reconstructed data have to be read from the external storage unit 405*b*. If Ref (1) is reconstructed to replace Ref (0), only 0.21 frames of reconstructed data have to be written to the external storage unit 405*b*. Afterwards, a relationship diagram such as FIG. 7 is established based on the compressed and reconstructed data in the internal and external storage units, and the decision unit 404 could reconstruct the reference frames required for the motion estimation and compensation based on the relationship diagram, so as to reduce the amount of data accessed to the external storage unit 405*b*.

FIG. 16A is a table comparing, under P=70%, the amount of data accessed by a decoder between using a conventional approach which stores five reference frames using reconstructed data in the external storage unit and using the present invention with or without scheme (5) which applies and does not apply full reconstructed frame into the internal or external storage device. As illustrated, the decoder of the present invention which does not apply the full reconstructed frame has 60% less data accessed between the processor and external storage unit 405*b*, compared to the conventional approach which stores 5 reference frames of reconstructed data in the external storage unit 405*b*. On the other hand, the decoder of the present invention which applies the full reconstructed frame has 39% less data accessed between the processor and external storage unit 405*b*, compared to the conventional approach which stores 5 reference frames of reconstructed data in the external storage unit 405*b*.

FIG. 16B is a table comparing, under P=70%, the amount of data accessed by an encoder between using a conventional approach which stores reference frames using reconstructed data in the external storage unit and using the present invention with or without scheme (5) which applies and does not apply a full reconstructed frame into the internal or external storage device. For the conventional approach which stores reconstructed data directly in the external storage unit, reading 45 frames and writing 1 frame are required, assuming that 5 reference frames are searched within a range of +16/−16 pixels.

As illustrated, the encoder of the present invention which does not apply a full reconstructed frame into the storage device has 70% less data accessed between the processor and external storage unit 405*b*, compared to the conventional approach which stores 5 reference frames of reconstructed data in the external storage unit 405*b*. On the other hand, the encoder of the present invention which applies a full reconstructed frame into the storage device has 38% less data accessed between the processor and external storage unit 405*b*, compared to the conventional approach which stores 5 reference frames of reconstructed data in the external storage unit 405*b*. As such, the present invention achieves significant savings in terms of the amount of data access and, thereby, the power consumption of the video codec.

The present invention utilizes four compression data storage methods and five schemes of determining the storage type to reduce the memory size and the amount of data accessed of the buffered-frame memory device. To further increase the utilization of the limited memory of the buffered-frame storage device, the present invention flexibly selects an appropriate scheme and a compression data storage method under a pre-determined memory constraint condition. When the memory taken up by the reference frames in the buffered-frame storage device satisfies the pre-determined memory constraint, a full or partial frame is stored using reconstructed data. As such, not only the memory usage is adapted to the video content, but also the computational complexity requirement is reduced for reconstructing the blocks in the reference frames when decoding blocks. A more efficient tradeoff between the memory size and the computational requirement is achieved. Therefore, the present invention indeed could lower the cost of the buffered-frame storage device and maintain a comparable video quality as conventional approaches.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for reducing the memory size and the amount of data accessed of a buffered-frame storage device for a video codec in accordance with a video encoding/decoding standard, said video codec comprising at least a decision unit and a buffered-frame storage device, said video codec referencing at least one reference frame stored in said buffered-frame storage device for motion estimation or motion compensation, said method comprising the steps of:
   (a) receiving a frame to be decoded which comprises a plurality of compressed blocks;
   (b) determining a storage unit for each of said compressed blocks respectively, said storage unit being a compressed block or a subblock of a compressed block;
   (c) determining a storage type for each of the storage units of said compressed blocks respectively by selecting at least one storage scheme from five storage schemes of said method; and
   (d) storing each of said storage units into said buffered-frame storage device according to said storage type of said storage unit, and returning to step (a) to process a next frame to be decoded;
   wherein each of said compressed blocks has a respective storage unit with a respective storage type, and the storage types determined for the storage units of said plurality of compressed blocks in said frame include both compressed data and reconstructed data; and
   wherein said five storage schemes consist of:
   scheme 1: using a subblock as a storage unit, the storage type of a given storage unit being compressed data if the subblock references an adjacent near-end frame, and the storage type being reconstructed data if the subblock references far-end frames;

scheme 2: using a compressed block as a storage unit, the storage type of a given storage unit being compressed data if all subblocks in the given storage unit reference only an adjacent near-end frame, and the storage type being reconstructed data if any of the subblocks in the given storage unit references far-end frames;

scheme 3: using a subblock as a storage unit and a topological pattern established for a currently decoded frame with a default storage type for each subblock, the storage type of a given storage unit being compressed data if both the storage type according to scheme 1 and the default storage type of the given storage unit are compressed data, and the storage type being reconstructed data if otherwise;

scheme 4: using a compressed block as a storage unit and a topological pattern established for a currently decoded frame with a default storage type for each compressed block, the storage type of a given storage unit being compressed data if both the storage type according to scheme 2 and the default storage type of the given storage unit are compressed data, and the storage type being reconstructed data if otherwise; and scheme 5: the storage type of a given storage unit being reconstructed data if memory capacity in said buffered-frame storage device does not exceed a pre-determined capacity constraint.

2. The method for reducing the memory size and the amount of data accessed of a buffered-frame storage device according to claim 1, wherein said storage unit for each of said compressed blocks is determined to be a block in said step (b).

3. The method for reducing the memory size and the amount of data accessed of a buffered-frame storage device according to claim 2, wherein the size of said block is 16×16.

4. The method for reducing the memory size and the amount of data accessed of a buffered-frame storage device according to claim 1, wherein each of said compressed blocks comprises a plurality of subblocks, and said storage unit for each of said compressed blocks is determined to be a subblock in said step (b).

5. The method for reducing the memory size and the amount of data accessed of a buffered-frame storage device according to claim 4, wherein the size of said subblock includes 16×8, 8×16, 8×8, 8×4, 4×8, and 4×4.

6. The method for reducing the memory size and the amount of data accessed of a buffered-frame storage device according to claim 1, wherein said step (c) comprises the steps of:
(c1) determining if there is a memory capacity constraint condition; if yes, continuing to step (c2); if not, going to step (c4);
(c2) determining whether to use reconstructed data based on said memory capacity constraint condition; if yes, continuing to step (c3); if not going to step (c4);
(c3) using reconstructed data;
(c4) determining a storage type for each of said storage units;
(c5) determining whether to further determine said storage type based on a topological pattern; if yes, continuing to step (c6); if not, going to said step (d); and
(c6) determining said storage type of said storage unit based on said topological pattern.

7. The method for reducing the memory size and the amount of data accessed of a buffered-frame storage device according to claim 6, wherein said step (c2) comprises the step of:
determining whether the memory taken up by reference frames from reference frame 0 to reference frame N is not greater than a pre-determined memory capacity threshold, if not, going to said step (c4); if yes, going to said step (c3).

8. The method for reducing the memory size and the amount of data accessed of a buffered-frame storage device according to claim 7, wherein said pre-determined memory capacity threshold is (N-L-1) frames of reconstructed data where L stands for frames to be deducted.

9. The method for reducing the memory size and the amount of data accessed of a buffered-frame storage device according to claim 6, wherein said step (c3) comprises the steps of:
(c31) determining whether to determine said storage type of each storage unit in the entire frame of a currently decoded frame as using reconstructed data, if yes, going to said step (c33); if not, going to said step (c32);
(c32) determining said storage type of each storage unit in a portion of said currently decoded frame as using reconstructed data and going to said step (c5); and
(c33) determining said storage type of each storage unit in the entire frame of said currently decoded frame as using reconstructed data and going to said step (d).

10. The method for reducing the memory size and the amount of data accessed of a buffered-frame storage device according to claim 6, wherein said step (c4) comprises the steps of:
(c41) if said storage unit is a block, determining whether to determine said storage type of said storage unit based on a plurality of subblocks contained in the block, if not, going to step (c43); if yes, continuing to step (c42);
(c42) if at least one of said subblocks references a far-end frame, going to step (c47); if not, continuing to step (c43);
(c43) determining whether said storage unit uses inter prediction; if yes, going to step (c45); if not, continuing to step (c44);
(c44) determining said storage type of said storage unit as using prediction mode and residual and going to said step (c5);
(c45) determining whether said storage unit references an adjacent near-end frame; if not, going to step (c47); if yes, continuing to step (c46);
(c46) determining said storage type of said storage unit as using motion vector and residual and going to said step (c5); and
(c47) configuring said storage type of said storage unit as using reconstructed data.

11. The method for reducing the memory size and the amount of data accessed of a buffered-frame storage device according to claim 10, wherein said prediction mode and said residual are video bit streams.

12. The method for reducing the memory size and the amount of data accessed of a buffered-frame storage device according to claim 10, wherein said motion vector and said residual are video bit streams.

13. The method for reducing the memory size and the amount of data accessed of a buffered-frame storage device according to claim 10, wherein said residual is one of residual after entropy decoding, residual after entropy decoding and de-quantization, and residual after entropy decoding, de-quantization and inverse transform.

14. The method for reducing the memory size and the amount of data accessed of a buffered-frame storage device according to claim 6, wherein said topological pattern of said step (c5) is a default storage type for the blocks of a currently decoded frame.

15. The method for reducing the memory size and the amount of data accessed of a buffered-frame storage device according to claim 6, wherein said step (c6) comprises the steps of:
- (c61) determining whether said storage type of said storage unit and a default storage type of a corresponding block of said topological pattern both use compressed data; if not, going to step (c63); if yes, continuing to step (c62);
- (c62) determining said storage type of said storage unit as using compressed data and going to said step (d); and
- (c63) determining said storage type of said storage unit as using reconstructed data.

16. The method for reducing the memory size and the amount of data accessed of a buffered-frame storage device according to claim 15, wherein said storage type of using compressed data includes prediction mode and residual, and motion vector and residual.

17. The method for reducing the memory size and the amount of data accessed of a buffered-frame storage device according to claim 16, wherein said prediction mode and said residual are video bit streams.

18. The method for reducing the memory size and the amount of data accessed of a buffered-frame storage device according to claim 16, wherein said motion vector and said residual are video bit streams.

19. The method for reducing the memory size and the amount of data accessed of a buffered-frame storage device according to claim 16, wherein said residual includes residual after entropy decoding, residual after entropy decoding and de-quantization, and residual after entropy decoding, de-quantization and inverse transform.

20. The method for reducing the memory size and the amount of data accessed of a buffered-frame storage device according to claim 1, wherein a reference frame 0 in said buffered-frame storage device has a storage type selected from one of reconstructed data, and prediction mode and residual.

21. The method for reducing the memory size and the amount of data accessed of a buffered-frame storage device according to claim 1, wherein, before a storage unit is stored into said buffered-frame storage device in said step (d), the storage unit undergoes a processing based on the storage unit's storage type, said processing including at least entropy decoding, and optionally any one of de-quantization, inverse transform and motion compensation.

22. The method for reducing the memory size and the amount of data accessed of a buffered-frame storage device according to claim 10, wherein, when said buffered-frame storage device comprises an external storage unit and an internal storage unit, said step (d) stores a storage unit whose storage type is using reconstructed data into said external storage unit; otherwise, stores said storage unit into said internal storage unit.

23. The method for reducing the memory size and the amount of data accessed of a buffered-frame storage device according to claim 22, further comprising the following step before said step (d):
- (d0) said decision unit establishing a relationship diagram according to the residuals and corresponding prediction parameters in said internal storage unit and the reconstructed data in said external storage unit, said decision unit, based on said relationship diagram, reconstructing reference frames required by motion estimation and motion compensation.

24. The method for reducing the memory size and the amount of data accessed of a buffered-frame storage device according to claim 23, wherein each of said prediction parameters is one of prediction mode and motion vector.

25. The method for reducing the memory size and the amount of data accessed of a buffered-frame storage device according to claim 1, wherein said video encoding/decoding standard is H.264.

26. The method for reducing the memory size and the amount of data accessed of a buffered-frame storage device according to claim 25, wherein said video codec references multiple reference frames stored in said buffered-frame storage device for motion estimation or motion compensation.

* * * * *